(12) United States Patent
Nakagawa et al.

(10) Patent No.: US 6,558,007 B2
(45) Date of Patent: May 6, 2003

(54) ILLUMINATION OPTICAL SYSTEM AND IMAGE PROJECTION APPARATUS

(75) Inventors: Tomoko Nakagawa, Izumi (JP); Shigeru Sawamura, Sakai (JP); Katsuhiro Takamoto, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/059,732

(22) Filed: Jan. 28, 2002

(65) Prior Publication Data

US 2002/0149939 A1 Oct. 17, 2002

(30) Foreign Application Priority Data

Jan. 30, 2001 (JP) .......................................... 2001-021251

(51) Int. Cl.[7] ............................................. G03B 21/28
(52) U.S. Cl. ......................... 353/98; 353/102; 362/551; 362/268
(58) Field of Search ................................ 362/268, 551, 362/328, 333, 334, 336, 338; 353/98, 102, 38, 69, 70

(56) References Cited

U.S. PATENT DOCUMENTS

| 5,475,512 | A | 12/1995 | Nakazawa et al. ............ 359/13 |
| 6,129,437 | A | 10/2000 | Koga et al. .................... 353/98 |
| 6,322,219 | B1 | * 11/2001 | Okamori et al. .............. 353/98 |
| 6,382,799 | B1 | * 5/2002 | Nishikawa et al. ......... 353/122 |
| 6,443,576 | B1 | * 9/2002 | Nishida et al. ................ 353/98 |
| 6,464,361 | B2 | * 10/2002 | Togino et al. ................ 353/98 |

FOREIGN PATENT DOCUMENTS

| JP | 04-118620 A | 4/1992 |
| JP | 07-212680 A | 8/1995 |
| JP | 2000-098272 A | 4/2000 |
| JP | 2000-121998 A | 4/2000 |
| JP | 2000-122589 A | 4/2000 |
| JP | 2000-267042 A | 9/2000 |
| JP | 2001-004956 A | 1/2001 |

* cited by examiner

*Primary Examiner*—Alan Cariaso
*Assistant Examiner*—Ali Alavi
(74) *Attorney, Agent, or Firm*—Sidley Austin Brown & Wood LLP (57) ABSTRACT

An illumination optical system has a light source, an integrator for making the intensity distribution of the light from the light source even, and a relay optical system for imaging the light from the integrator on a plane conjugate with the exit surface of the integrator. The relay optical system includes a rear lens unit of which the refractive power is asymmetrical in one direction so that the plane on which the light is imaged is inclined relative to the optical axis of the relay optical system. This makes it possible to direct light to an inclined surface with an even intensity distribution and with minimum loss of the illumination light.

16 Claims, 7 Drawing Sheets

ILLUMINATION OPTICAL SYSTEM AND IMAGE PROJECTION APPARATUS

This application is based on Japanese Patent Application No. 2001-21251 filed on Jan. 30, 2001, the contents of which are hereby incorporated by reference.

BACKGROUND OF THE INVENTION

1. Field of the Invention

The present invention relates to an illumination optical system that directs light with a substantially even intensity distribution to a target to be illuminated, and also relates to an image projection apparatus that projects light representing an image by reflecting the light from an illumination optical system by using an image display device that reflects light in two directions in such a way that the light reflected in one of those directions represents an image.

2. Description of the Prior Art

In recent years, image projection apparatus provided with a reflection-type image display device called a DMD (digital micromirror device) have been developed. A DMD has a reflective surface composed of a large number of minute mirror elements arranged in a two-dimensional array, and each mirror element is rotatable about an axis perpendicular to the normal thereto so that its direction (the direction of its normal) can be controlled individually. The rotation axes of all the mirror elements are parallel, and the direction of each mirror element is chosen between two predetermined directions according to the image signal. Thus, the illumination light fed to the DMD is reflected in two directions in such a way that light representing the desired image is reflected in one direction and unnecessary light, i.e. light that does not represent the desired image, is reflected in the other direction.

In the following descriptions, light representing the desired image is referred to as the ON light, unnecessary light is referred to as the OFF light, the direction of a mirror element in which it generates the ON light is referred to as the ON direction, and the direction of a mirror element in which it generates the OFF light is referred to as the OFF direction. The range in which a mirror element can change its direction (i.e. the range of its rotation angles) is narrow; specifically, the angle difference between the ON and OFF directions is typically about 10°, and thus the angle difference between the ON and OFF light is about 20°.

The direction of each mirror element is switched at high speed. The amount of ON light is determined by the time for which a mirror element is directed in the ON direction. Thus, by controlling the time for which each mirror element is directed in the ON direction according to the image signal, it is possible to make the individual mirror elements reflect different amounts of ON light so that the ON light as a whole represents an image.

An illumination optical system for illuminating a DMD is arranged in such a way that illumination light is directed to the DMD from a direction perpendicular to the rotation axes of the mirror elements thereof, and the DMD is controlled in such a way that the angle of the OFF light relative to the illumination light is larger than the angle of the ON light relative to the illumination light. That is, the principal rays of the illumination light, ON light, and OFF light lie on the same plane, and the ON light travels between the illumination light and the OFF light.

The illumination light may be directed to the DMD from a direction nearly perpendicular to the DMD or from a direction considerably inclined relative to the DMD. When the illumination light is directed to the DMD from a direction nearly perpendicular thereto, the angle difference between the illumination light and the ON light is small, and thus these two beams of light partially overlap with each other. This makes it necessary to separate the illumination light and the ON light, and this is achieved by exploiting the total reflection of light in a prism. Specifically, a prism is arranged immediately in front of the DMD, and the illumination light is directed into the prism from the side so that the illumination light is totally reflected by the oblique surface of the prism and is thereby directed to the DMD; on the other hand, the ON light is transmitted through the prism so as to be directed to a projection optical system.

When the illumination light is directed to the DMD from a direction considerably inclined relative thereto, the angle difference between the illumination light and the ON light is large, preventing these two beams of light from overlapping with each other. Thus, the illumination light can be shone directly on the DMD. This eliminates the need to use a prism, and thus helps simplify the optical arrangement.

To obtain evenly bright images, it is preferable that the illumination light have as even an intensity distribution as possible on the DMD. To achieve this, the illumination optical system is provided with, in addition to a light source that emits the illumination light, an integrator for making the intensity distribution of the illumination light from the light source even and a relay optical system for making the exit surface of the integrator substantially conjugate with the DMD. To permit the light from the light source to be used efficiently for the illumination of the DMD, the exit surface of the integrator is given a shape that is geometrically similar to the DMD. The relay optical system is generally composed of a front lens unit disposed on the entrance side, a rear lens unit disposed on the exit side, and an aperture stop for obtaining an f-number identical with that of the projection optical system. The aperture stop is disposed in the optical path leading from the front lens unit to the rear lens unit, in the vicinity of the front lens unit.

In the above described illumination optical system provided with a prism, in which the illumination light is introduced from a direction nearly perpendicular to the DMD, the image formed on the exit surface of the integrator by the relay optical system is largely parallel to the DMD, and thus the illumination light has a substantially even intensity distribution on the DMD. Moreover, almost all the illumination light can be shone on the DMD, and thus the DMD can be illuminated brightly.

Figure 12:
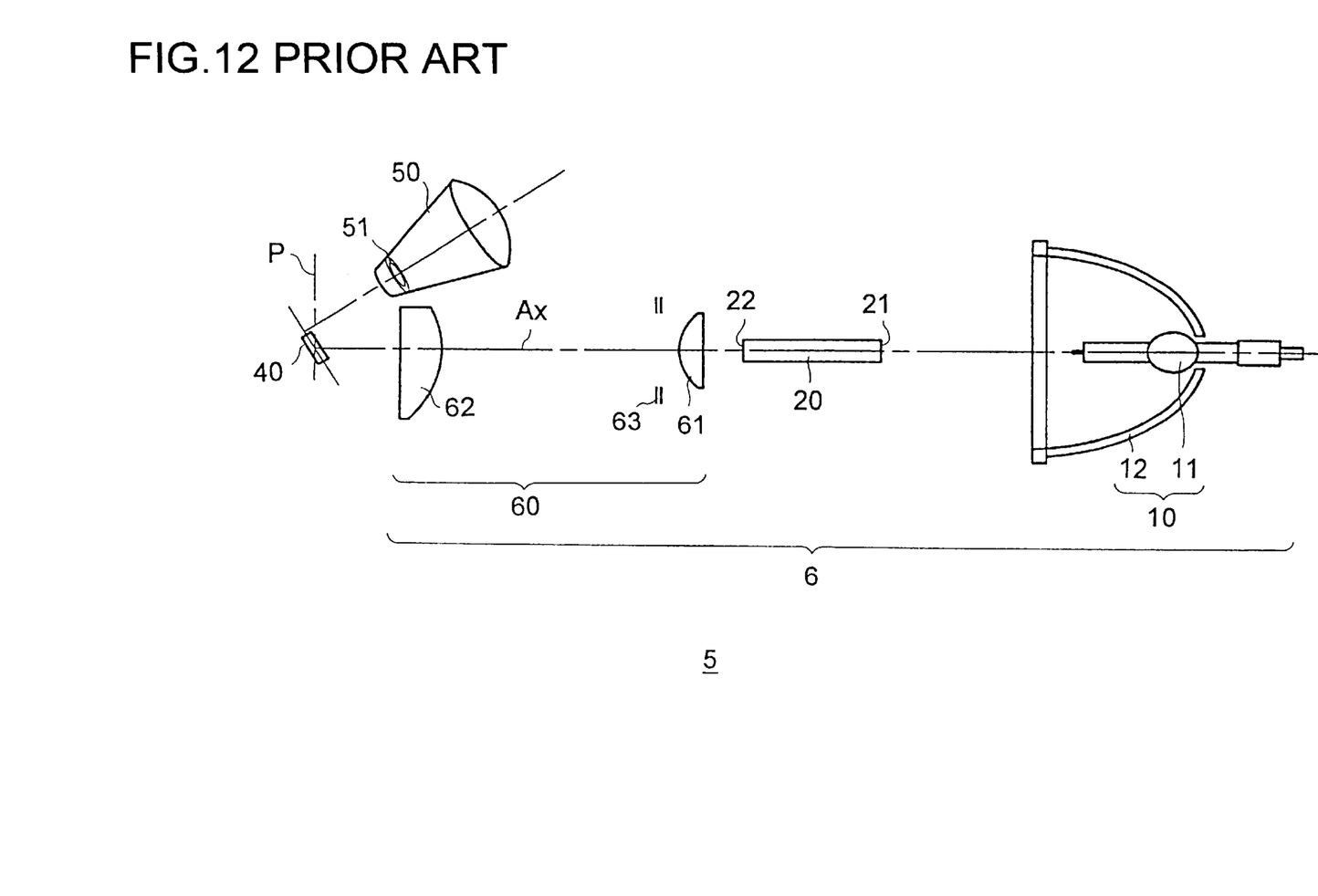
FIG. 12 is a diagram schematically showing the optical arrangement of a conventional image projection apparatus.

FIG. 12 schematically shows the optical arrangement of an image projection apparatus provided with an illumination optical system in which illumination light is introduced from a direction considerably inclined relative to the DMD. This image projection apparatus 5 is provided with an illumination optical system 6, a DMD 40, and a projection optical system 50. The illumination optical system 6 is composed of a light source 10, an integrator 20, and a relay optical system 60. The light source 10 is composed of a lamp 11 and a reflector 12 having the shape of an ellipsoid of revolution, with the lamp 11 disposed at the first focal point of the reflector 12.

The integrator 20 is a rod having a rectangular cross section, and is arranged in such a way that the entrance-side end surface 21 thereof is disposed at the second focal point of the reflector 12. The light emitted from the lamp 11 and reflected from the reflector 12 converges on the end surface 21, and enters the integrator 20. The light then, by being totally reflected from the side surfaces of the integrator 20, reaches the exit-side end surface 22 thereof. The number of times that different portions of the light are totally reflected from the side surfaces of the integrator 20 depends on the angles of incidence at which they strike the end surface 21. Thus, central and peripheral portions of the light mix on the exit-side end surface 22, smoothing the intensity distribution of the light (making it even).

The relay optical system 60 is composed of a front lens unit 61, a rear lens unit 62, and an aperture stop 63. The front and rear lens units 61 and 62 each include a rotationally symmetrical lens element only. The relay optical system 60 forms the image of the exit-side end surface 22 of the integrator 20 on a plane P perpendicular to the optical axis Ax of the relay optical system 60.

The DMD 40 is arranged with its center located at the intersection between the optical axis Ax of the relay optical system 60 and the plane P on which the image of the exit-side end surface 22 is formed, and with a considerable inclination relative to the plane P. The DMD 40 is rectangular in shape, and the cross section of the integrator 20 is geometrically similar to the DMD 40. The individual mirror elements of the DM 40 are each square in shape, and the DMD 40 as a whole is made rectangular in shape as a result of the mirror elements being arranged in an array having different numbers of mirror elements in the height and width directions thereof. The rotation axis of each mirror element coincides with a diagonal thereof, and is perpendicular to the plane of FIG. 12.

The projection optical system 50 is arranged in a position where it receives the ON light from the DMD 40, and projects the ON light that has entered it onto a screen (not shown) so that the image represented by the ON light is formed on the screen. It is to be noted that the optical axis of the projection optical system 50 does not coincide with the optical axis Ax of the relay optical system 60 as turned by the relay optical system 60, so that the ON light enters the projection optical system 50 from a somewhat oblique direction. It is also to be noted that, although the rear lens unit 62 of the relay optical system 60 has a portion thereof cut away so as not to lie in the optical path of the ON light, the portion so cut away lies outside the optical path of the illumination light as well. Therefore, the asymmetrical shape of the rear lens unit 62 does not affect the illumination light; that is, the rear lens unit 62 has rotationally symmetrical refractive power.

In the image projection apparatus 5, in which illumination light is introduced from a direction considerably inclined relative to the DMD 40, the DMD 40 is inclined relative to the image plane P of the exit-side end surface 22 of the integrator 20. As a result, as opposed to the arrangement in which illumination light is introduced from a direction nearly perpendicular to the DMD, the illumination light has a less even intensity distribution on the DMD 40, and less of the illumination light is eventually used for the illumination of the DMD 40.

Figure 13:
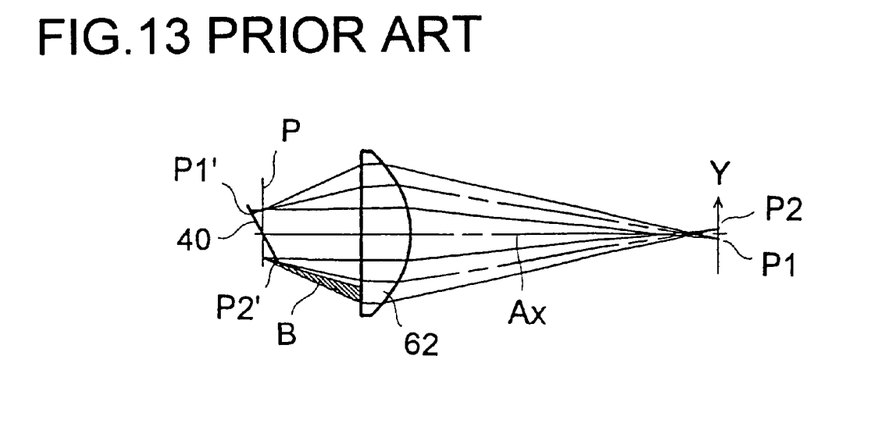
FIG. 13 is a diagram schematically showing the optical path of the illumination light in a conventional image projection apparatus.

The reason will be described below with reference to FIG. 13, which shows the optical path of the illumination light, and FIG. 14, which shows the illuminated area on the plane including the DMD 40 (i.e. the area within which the illumination light is incident). Supposed that, as shown in FIG. 13, rays of light from two arbitrary points P1 and P2 that are located symmetrically about the optical axis Ax pass through the rear lens unit 62 and reach points P1' and P2', respectively, on the DMD 40. The rays from the points P1 and P2 have an equal amount of light and are symmetrical about the optical axis Ax, and this symmetry is kept after the rays have passed the rear lens unit 62. However, the distances from the optical axis Ax to the points P1' and P2' differ, and the imaging conditions at the points P1' and P2' also differ. As a result, the illumination light exhibits an uneven intensity distribution on the DMD 40, with a gradient in the direction from the point P1' to the point P2'.

Figure 14:
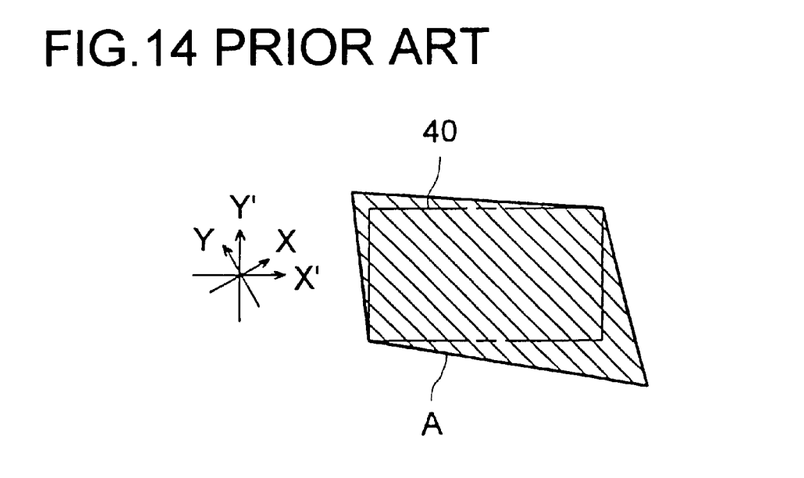
FIG. 14 is a diagram schematically showing the illuminated area on the plane including the DMD in a conventional image projection apparatus.

Moreover, whereas the illuminated area on the plane P is rectangular, i.e. geometrically similar to the exit-side end surface 22 of the integrator 20, the illuminated area A on the plane including the DMD 40 is distorted as shown in FIG. 14, and thus a significant proportion of the illumination light does not strike the DMD 40. This loss of the illumination light aggravates the uneven intensity distribution of the illumination light on the DMD 40. The degree of distortion is particularly high in the portion of the DMD 40 closer to the rear lens unit 62, and the illumination light is lost most in the portion B thereof hatched in FIG. 13.

Even when the illumination light has an uneven intensity distribution on the DMD, it is possible to obtain evenly bright images by making the time for which the mirror elements located where the illumination light has high intensity are directed in the ON direction shorter than the time for which the mirror elements located where the illumination light has low intensity are directed in the ON direction. However, this lowers the brightness of the obtained image, and complicates the control of the DMD.

Several proposals have been made for making the intensity distribution of illumination light on a DMD even. For example, Japanese Patent Application Laid-Open No. 2000-98272 proposes arranging a mirror within an illumination optical system to turn the optical path, and forming the mirror in an angled shape having a ridge line parallel to the rotation axis of the mirror elements of the DMD so that the illumination light is dispersed from the central portion to the peripheral portion thereof.

On the other hand, Japanese Patent Application Laid-Open No. 2000-121998 proposes omitting the rear lens unit of a relay optical system and instead arranging a mirror array in the vicinity of an aperture stop so that the light from the front lens unit is imaged on the mirror array and illumination light is directed from the individual mirrors constituting the mirror array to a DMD. The inclination of each mirror is set in such a way that the illumination light efficiently strikes the DMD.

According to the method proposed in Japanese Patent Application Laid-Open No. 2000-98272 mentioned above, the portion of the illumination light that would otherwise strike the central portion of the DMD where the illumination light tends to have relatively high intensity can be diverted to the peripheral portion of the DMD, resulting in a more even intensity distribution. However, a portion of the illumination light that would strike the DMD if the mirror had not an angled shape does not strike the DMD, leading to still lower intensity on the DMD.

According to the method proposed in Japanese Patent Application Laid-Open No. 2000-121998 mentioned above, the loss of the illumination light is reduced, with the result that the uneven intensity distribution can be alleviated and the overall intensity can be increased. However, there is no way to avoid the gradient in the intensity of the illumination light on the DMD, and thus it is impossible to obtain a satisfactorily even intensity distribution.

As discussed above, with conventional illumination optical systems, it is impossible to make the intensity distribution of illumination light even and simultaneously minimize the loss of the illumination light.

SUMMARY OF THE INVENTION

An object of the present invention is to provide an illumination optical system that permits an inclined surface to be illuminated with illumination light with an even intensity distribution and with minimum loss of the illumination light. Another object of the present invention is to provide an image projection apparatus that makes efficient use of illumination light to offer bright images.

To achieve the above objects, according to one aspect of the present invention, an illumination optical system is provided with: a light source; a smoothing device, having an entrance surface through which the light from the light source enters the smoothing device and an exit surface through which the light that has entered the smoothing device exits therefrom, for smoothing the intensity distribution of the light on the exit surface; and a relay optical system, including a front lens unit through which the light that has exited from the smoothing device enters the relay optical system, a rear lens unit of which the refractive power exhibits asymmetry in one direction and through which the light that has entered the relay optical system exits therefrom, and an aperture stop disposed between the front and rear lens units so as to restrict the diameter of a light flux, for making the light from different parts of the exit surface of the smoothing device converge so as to form an image of the exit surface of the smoothing device.

When the rear lens unit of the relay optical system is given asymmetrical refractive power, whereas on a plane perpendicular to the optical axis of the relay optical system the exit surface of the integrator is imaged under asymmetrical imaging conditions, on a plane inclined relative to the optical axis of the relay optical system the exit surface of the integrator is imaged under symmetrical imaging conditions. In this way, it is possible to make the intensity distribution of the illumination light on an inclined surface even, and it is also possible to direct the illumination light to within the desired area on an inclined surface.

Here, the asymmetry of the refractive power of the rear lens unit may be defined by the shape of only one of the lens surfaces included in the rear lens unit. This makes the design and manufacture of the relay optical system easy.

The surface may or may not have a portion thereof made discontiguous with the portion thereof adjoining that portion. In the former case, the relevant lens element is easy to manufacture. For example, the portion discontiguous with the portion adjoining it may be fan-shaped. In the latter case, it is possible to accurately set the evenness of the intensity distribution of the illumination light and the illuminated area on an inclined surface.

According to another aspect of the present invention, an image projection apparatus is provided with: an image display device having a reflective surface composed of a large number of mirror elements that are individually directed either in a first or second direction according to an image signal; an illumination optical system for directing light having a smoothed intensity distribution to an area including the reflective surface of the image display device from a direction inclined relative to the reflective surface in such a way as to smooth the intensity distribution of the light again near the reflective surface; and a projection optical system for projecting the light reflected from the mirror elements directed in the first direction. Here, the illumination optical system is provided with: a light source; a smoothing device, having an entrance surface through which the light from the light source enters the smoothing device and an exit surface through which the light that has entered the smoothing device exits therefrom, for smoothing the intensity distribution of the light on the exit surface; and a relay optical system, including a front lens unit through which the light that has exited from the smoothing device enters the relay optical system, a rear lens unit of which the refractive power exhibits asymmetry in one direction and through which the light that has entered the relay optical system exits therefrom, and an aperture stop disposed between the front and rear lens units so as to restrict the diameter of a light flux, for making the light from different parts of the exit surface of the smoothing device converge so as to form an image of the exit surface of the smoothing device. Moreover, the direction in which the refractive power of the rear lens unit exhibits asymmetry coincides with the direction from which the light is directed to the reflective surface, and the refractive power of the rear lens unit is higher in a portion thereof closer to the reflective surface than in a portion thereof farther from the reflective surface.

The image display device is a DMD, and the light reflected from the mirror elements directed in the first direction constitutes ON light representing an image. The ON light is projected by the projection optical system. The illumination of the image display device is achieved by the use of the illumination optical system described above. The illumination light is inclined relative to the image display device, but the direction in which the refractive power of the rear lens unit of the relay optical system exhibits asymmetry coincides with the inclination of the illumination light. Thus, it is possible to illuminate the image display device evenly. Moreover, the refractive power of the rear lens unit of the relay optical system is higher in a portion thereof closer to the reflective surface, and this reduces the proportion of the illumination light that does not strike the image display device. Thus, it is possible to illuminate the image display device brightly.

According to still another aspect of the present invention, an image projection apparatus is provided with: a light source; a smoothing device, having an entrance surface through which the light from the light source enters the smoothing device and an exit surface through which the light that has entered the smoothing device exits therefrom, for smoothing the intensity distribution of the light on the exit surface; a relay optical system, including a lens element of which the refractive power exhibits asymmetry in one direction, for making the light from different parts of the exit surface of the smoothing device converge so as to form an image of the exit surface of the smoothing device; an image display device having a reflective surface composed of a large number of mirror elements that are individually directed either in a first or second direction according to an image signal; and a projection optical system for projecting the light reflected from the mirror elements directed in the first direction.

In this image projection apparatus also, the relay optical system is given refractive power asymmetrical in one direction. Thus, even when the image display device is arranged so as to be inclined relative to the light from the relay optical system, it is possible to make the intensity distribution of the light on the image display device even, and to shine as much light as possible on the image display device.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
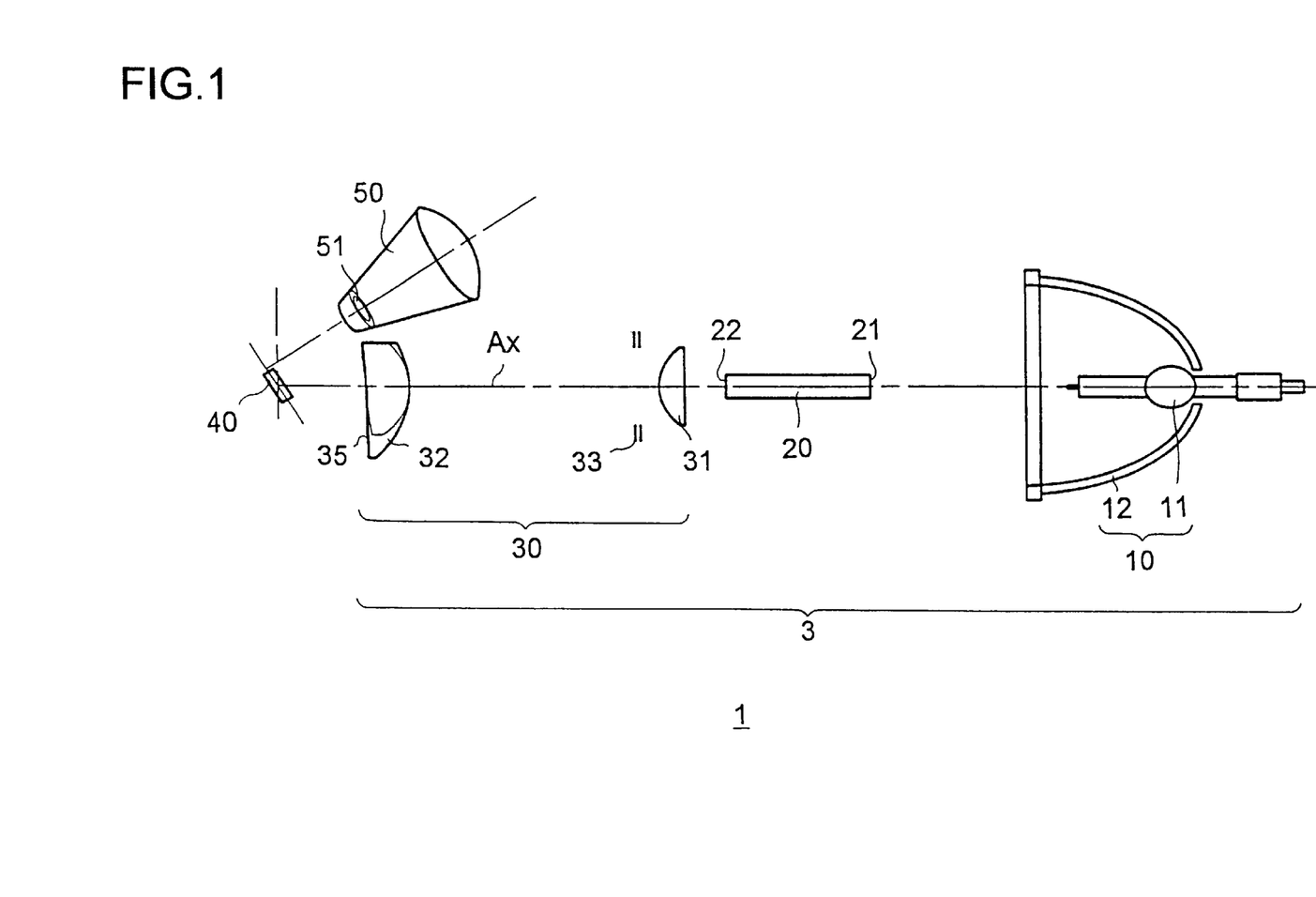
FIG. 1 is a diagram schematically showing the optical arrangement of an image projection apparatus embodying the invention.

Hereinafter, illumination optical systems and image projection apparatus embodying the present invention will be described with reference to the drawings. FIG. 1 schematically shows the optical arrangement of an image projection apparatus 1 embodying the invention. The image projection apparatus 1 is provided with an illumination optical system 3 composed of a light source 10, an integrator 20, and a relay optical system 30, a DMD 40, and a projection optical system 50. The image projection apparatus 1 is characterized by the design of the illumination optical system 3, in particular the relay optical system 30 provided therein. The light source 10, the integrator 20, the DMD 40, and the projection optical system 50 are designed and set in the same manner as in the conventional image projection apparatus 5 shown in FIG. 12, and therefore overlapping explanations will not be repeated.

The relay optical system 30 is composed of a front lens unit 31 and a rear lens unit 32 both having a positive refractive power, and an aperture stop 33 disposed in the optical path leading from the front lens unit 31 to the rear lens unit 32, in the vicinity of the rear lens unit 32. The front and rear lens units 31 and 32 make the illumination light from the integrator 20 converge and thereby form an image of the exit-side end surface 22 of the integrator 20 in the vicinity of the DMD 40. The aperture stop 33 restricts the diameter of a flux of the illumination light in such a way that the ON light fits the f-number of the projection optical system 50, which is determined by an aperture stop 51.

The front lens unit 31 includes a rotationally symmetrical lens element only, as does the front lens unit 61 of the image projection apparatus 5. On the other hand, the rear lens unit 32 includes a lens element having a surface 35 whose shape is asymmetrical in one direction with respect to the optical axis Ax of the relay optical system 30, offering asymmetrical refractive power in that direction. The rear lens unit 32 has a portion thereof cut away so as not to lie in the optical path of the ON light traveling from the DMD 40 to the projection optical system 50. This, however, has nothing to do with the fact that the rear lens unit 32 exhibits asymmetrical refractive power.

The DMD 40 is arranged in such a way that its center substantially coincides with the position in which the illumination light traveling in the vicinity of the optical axis Ax of the relay optical system 30 is imaged, and that the DMD 40 is inclined relative to the optical axis Ax. The rotation axes of the individual mirror elements of the DMD 40 are perpendicular to the optical axis Ax (i.e. perpendicular to the plane of FIG. 1).

Figure 2:
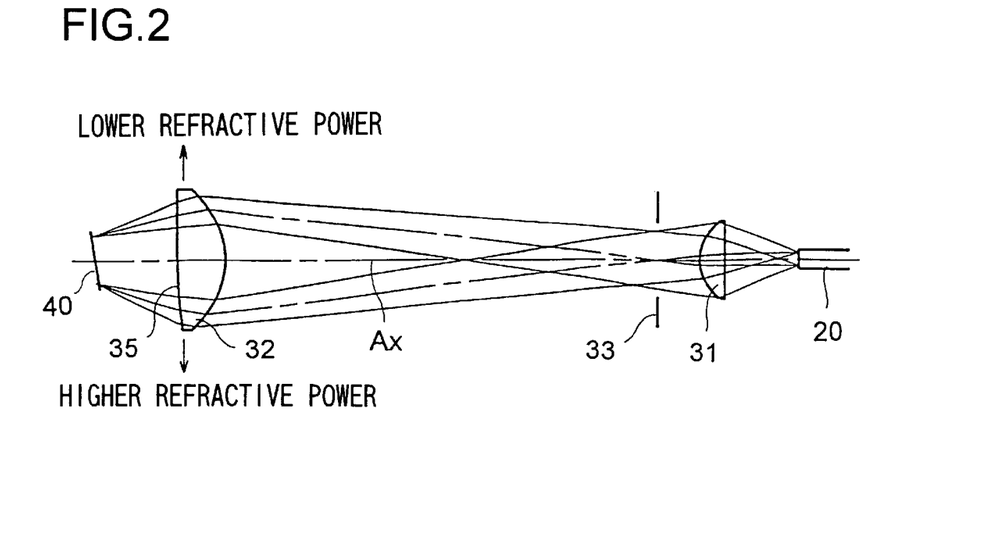
FIG. 2 is a sectional view taken along the plane including the optical axis of the relay optical system and perpendicular to the rotation axes of the mirror elements of the DMD.
Figure 3:
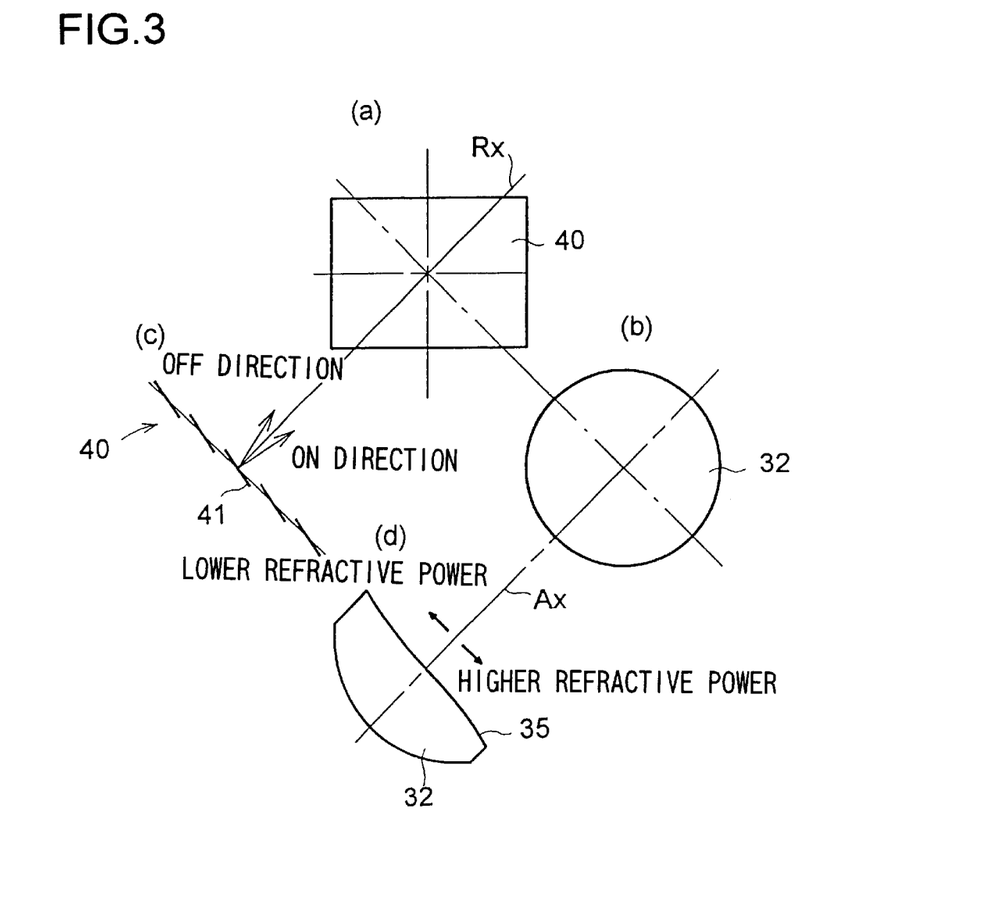
FIG. 3 is a diagram schematically showing the positions of the rear lens unit of the relay optical system and the DMD relative to each other.

The direction in which the refractive power of the rear lens unit 32 exhibits asymmetry is perpendicular to the rotation axes of the mirror elements (i.e. parallel to the plane of FIG. 1). Moreover, the rear lens unit 32 is so designed as to have higher refractive power in a portion thereof closer to the DMD 40 (i.e. the lower portion in FIG. 1) than in a portion thereof farther from the DMD 40 (the upper portion in FIG. 1). FIGS. 2 and 3 show the relationship between the direction of the rear lens unit 32 relative to the DMD 40 and the refractive power of the rear lens unit 32. FIG. 2 is a sectional view taken along the plane including the optical axis Ax and perpendicular to the rotation axes of the mirror elements. The shape of the surface 35 of the rear lens unit 32 is asymmetrical in the direction along the plane of the figure with respect to the optical axis Ax.

FIG. 3, at (a) and (b) are respectively shown the DMD 40 and the rear lens unit 32 as seen from a direction along the optical axis Ax and depicted apart from each other. The symbol Rx represents the rotation axis of the mirror element located at the center of the DMD 40. At (c) is shown the DMD 40 as seen from a direction along the rotation axis Rx, together with the mirror elements 41 directed in the ON direction. At (d) is shown the rear lens unit 32 as seen from a direction parallel to the rotation axis Rx.

The rear lens unit 32 exhibits higher refractive power in the ON direction of the mirror elements 41 than in the OFF direction thereof. This makes it possible to make the intensity distribution of the illumination light on the DMD 40 even and to greatly reduce the loss of the illumination light by shining most of it on the DMD 40.

Figure 4:
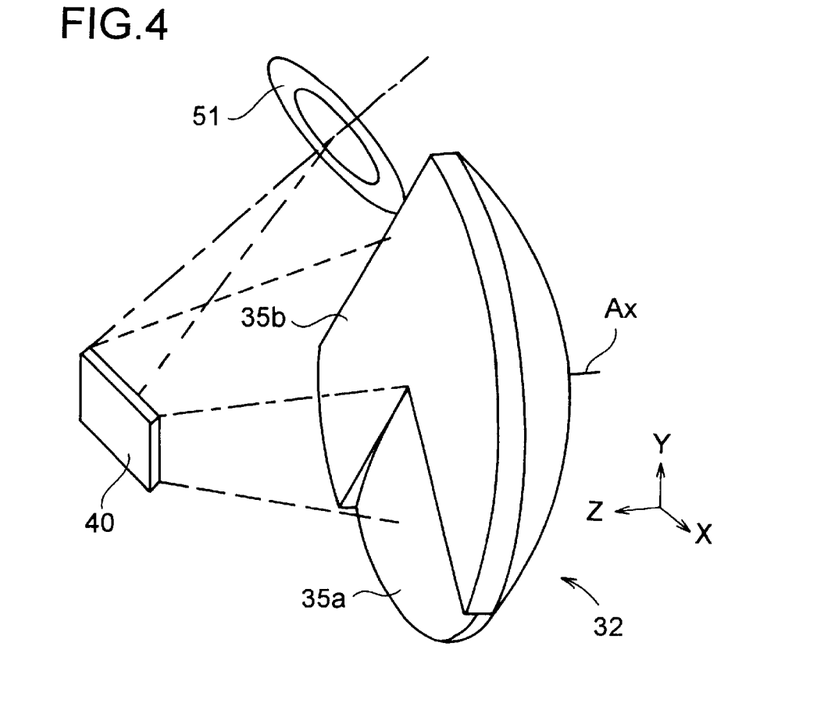
FIG. 4 is a perspective view schematically showing the rear lens unit of the relay optical system having a discontiguous surface shape.

The asymmetrical surface 35 of the rear lens unit 32 may be formed so as to include a portion discontiguous with the portion adjoining it, or may be formed so as to be contiguous overall. FIG. 4 shows an example of the rear lens unit 32 including a discontiguous portion. In this example, a fan-shaped portion 35a of the rear lens unit 32 with a 90° central angle about its intersection with the optical axis Ax is made discontiguous with the remaining portion 35b. The portion 35a is an aspherical convex surface, and the portion 35b is a flat surface perpendicular to the optical axis Ax.

Figure 5:
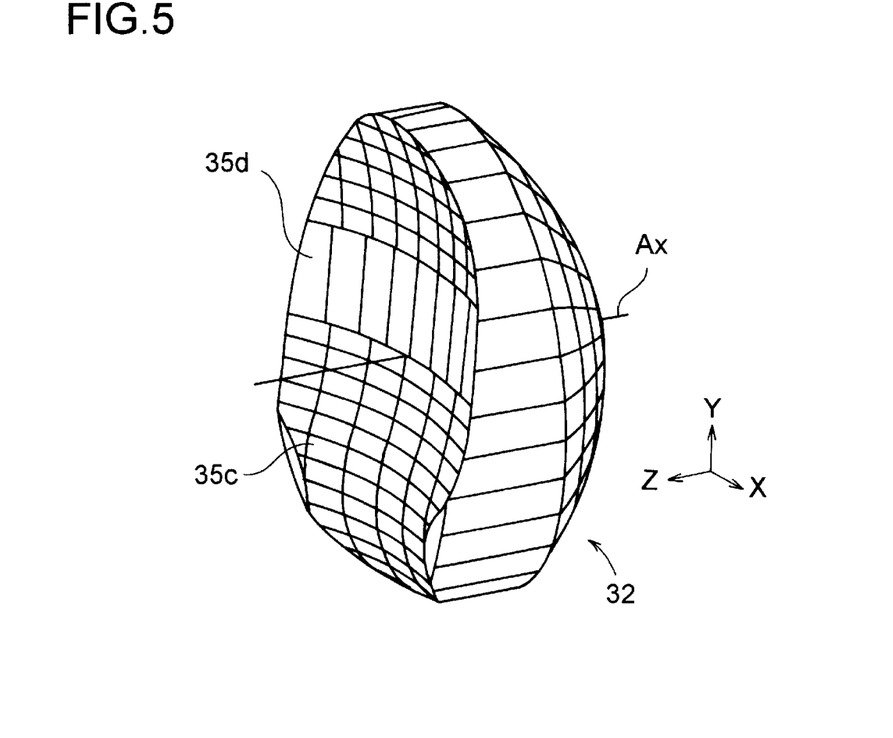
FIG. 5 is a perspective view schematically showing the rear lens unit of the relay optical system having a contiguous surface shape.

FIG. 5 shows an example of the rear lens unit 32 of which the surface 35 is contiguous overall. In this example, the surface 35 is a toroidal surface having semicircular portions 35c and 35d that are asymmetrical with each other. It is to be noted that, in FIG. 5, the rear lens unit 32 is shown complete with its portion that is to be cut away.

Figure 6:
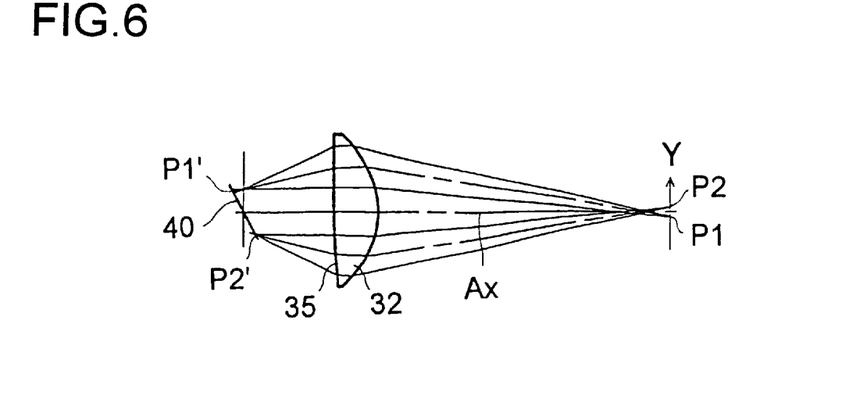
FIG. 6 is a diagram schematically showing the optical path of the illumination light in the image projection apparatus.
Figure 7:
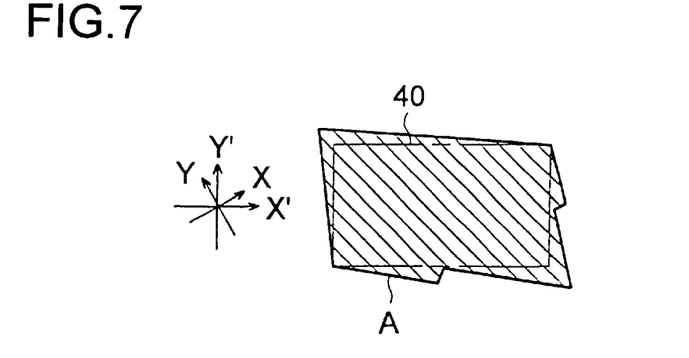
FIG. 7 is a diagram schematically showing the illuminated area on the plane including the DMD in the image projection apparatus.

Now, taking up as an example the case where the surface 35 is shaped as shown in FIG. 4, why the optical arrangement described above helps increase the evenness of the intensity distribution of the illumination light on the DMD 40 and reduce the loss of the illumination light will be described with reference to FIGS. 6 and 7. FIG. 6 shows the optical path of the illumination light, and FIG. 7 shows the illuminated area on the plane including the DMD 40, respectively corresponding to FIGS. 13 and 14 described earlier.

As shown in FIG. 6, rays of light from two arbitrary points P1 and P2 that are located symmetrically about the optical axis Ax reach points P1' and P2', respectively, on the DMD 40. Here, the rear lens unit 32, which has higher refractive power in a portion thereof closer to the DMD 40, can reduce the difference between the distances from the optical axis Ax to the points P1' and P2', whereas the conventional rear lens unit 62 shown in FIG. 13, which has symmetrical refractive power, can not. This reduces the gradient of the intensity of the illumination light on the DMD 40, and thereby increases the evenness of its intensity distribution. Moreover, as shown in FIG. 7, the distortion of the illuminated area A on the plane including the DMD 40 can be made less serious than the conventionally observed distortion shown in FIG. 14. This makes it possible to greatly reduce the loss of the illumination light and thereby further increase the evenness of its intensity distribution.

Figure 8:
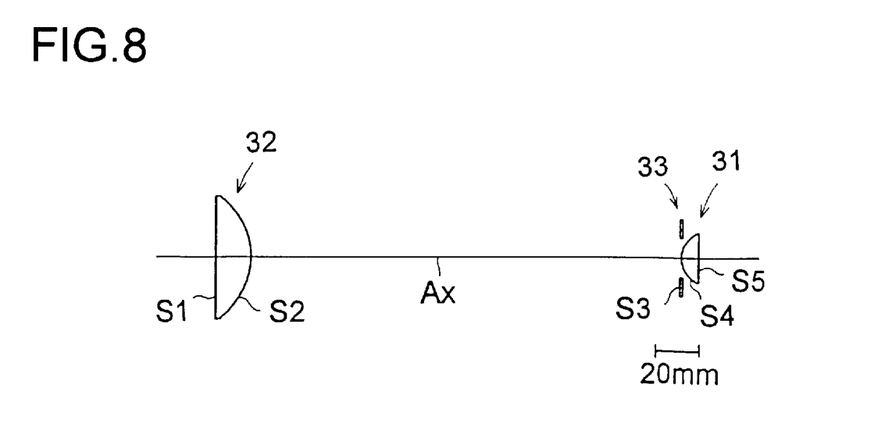
FIG. 8 is a sectional view showing the optical arrangement of the relay optical system used in practical examples.

Hereinafter, practical examples of the relay optical system 30 will be presented. The optical arrangement common to all the examples is shown in FIG. 8, and its construction data is shown in Table 1. In all the examples, the front and rear lens units 31 and 32 are each composed of a single lens element, and the exit-side surface S1 of the rear lens unit 32 is given an asymmetrical shape. The entrance-side surface S2 of the rear lens unit 32 and the exit-side surface S4 of the front lens unit 31 are each an aspherical surface of which the shape is defined by formula (1) below. Here, Z represents the sag along the optical axis (i.e. in the Z-axis direction), and $C_0=1/CR$.

$$Z=C_0 \cdot Y^2/[1+(1-\epsilon \cdot C_0^2 \cdot Y^2)^{1/2}]+A_2 \cdot Y^2+A_3 \cdot Y^3+ \ldots +A_{16} \cdot Y^{16} \quad (1)$$

In a first practical example, the asymmetrical surface 35 (surface S1) of the rear lens unit 32 is given a discontiguous shape as shown in FIG. 4. Here, in the fan-shaped aspherical portion 35a, CR=170.0 mm, $\epsilon=-30$, and $A_2$ to $A_{16}=0$; in the portion 35b, CR=∞.

In a second practical example, the asymmetrical surface 35 (surface S1) of the rear lens unit 32 is given a contiguous shape as shown in FIG. 5. Here, with respect to the toroidal surface of which the shape is defined by formula (2) below, in the portion 35c, CRx=100.0 mm, CRy=5000.0 mm, $\epsilon=-50$, and $A_2$ to $A_{16}=0$; in the portion 35d, CRx=-400.0 mm, CRy=5000.0 mm, $\epsilon=0$, and $A_2$ to $A_{16}=0$.

$$X^2+(Z-CRy)^2=\{CRy-C_0 \cdot Y^2[1+(1-\epsilon \cdot C_0^2 \cdot Y^2)^{1/2}]\}^2 \quad (2)$$

Figure 9:
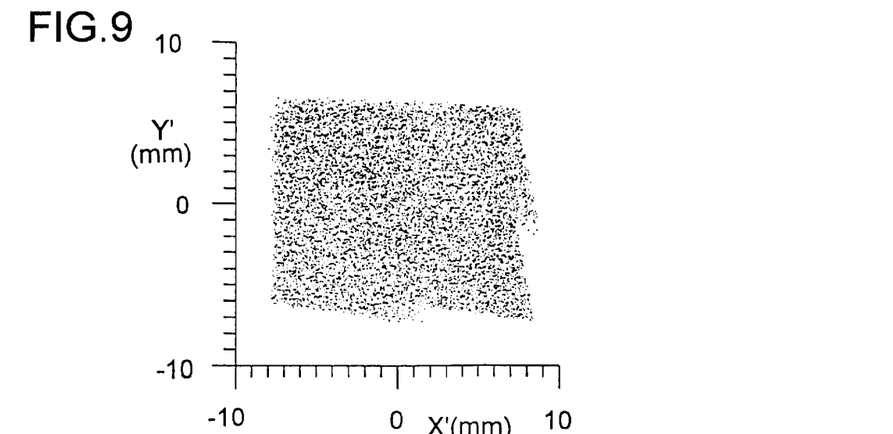
FIG. 9 is a diagram showing the intensity distribution of the illumination light on the plane including the DMD in a first practical example.
Figure 10:
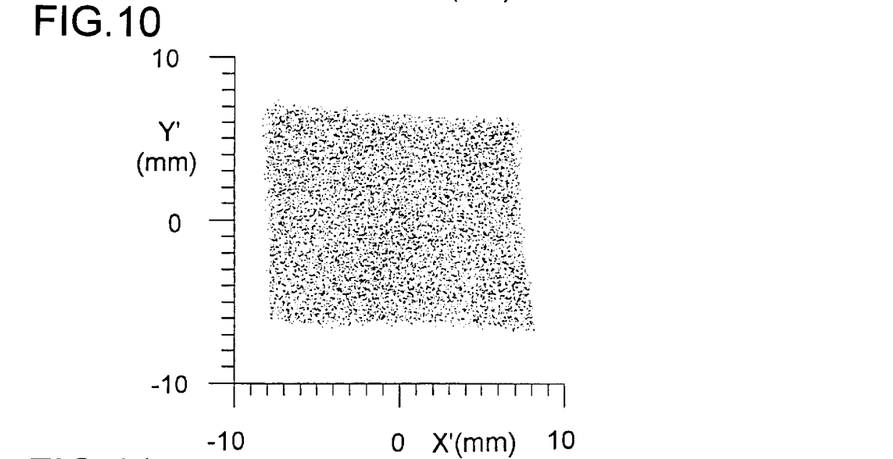
FIG. 10 is a diagram showing the intensity distribution of the illumination light on the plane including the DMD in a second practical example.
Figure 11:
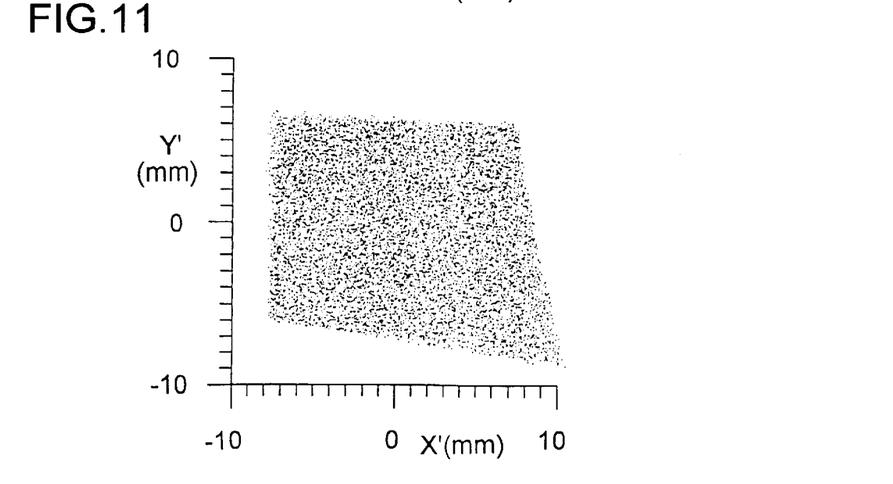
FIG. 11 is a diagram showing the intensity distribution of the illumination light on the plane including the DMD in a comparative example.

FIGS. 9 and 10 show the intensity distribution of the illumination light on the plane including the DMD 40 in the first and second practical examples, respectively. FIG. 11 shows the intensity distribution of the illumination light on the plane including the DMD 40 in a comparative example in which the surface 35 (surface S1) is flat overall.

Whereas the evenness of the illumination light (the ratio of its minimum intensity to its maximum intensity) is 0.60 in the comparative example, it is 0.66 and 0.68 in the first and second practical examples, respectively. Moreover, assuming that the amount of illumination light that strikes the DMD 40 in the comparative example is 1, that amount observed in the first and second practical examples is 1.06 and 1.08, respectively.

In the examples described above, the exit-side surface S1 of the rear lens unit 32 is formed into the surface 35 having an asymmetrical shape; however, it is also possible to form the entrance-side surface S2, or both the entrance-side surface S2 and the exit-side surface S1, into a surface having an asymmetrical shape. The rear lens unit may be composed of a plurality of lens elements, with one or more surfaces included therein given an asymmetrical shape.

Obviously, many modifications and variations of the present invention are possible in light of the above teachings. It is therefore to be understood that within the scope of the appended claims, the invention may be practiced other than as specifically described.

TABLE 1

| Surface | Radius of Curvature CR (mm) | Radius R (mm) | Axial Distance T (mm) | Refractive Index Nd | Dispersion νd |
|---|---|---|---|---|---|
| S1 | Asymmetrical | 26.00 | 15.500 | 1.52307 | 58.57 |
| S2 | −29.000 | 26.00 | 191.147 | | |
| S3 | ∞ | 8.79 | 0.000 | | |
| S4 | 10.437 | 10.00 | 8.000 | 1.52307 | 58.57 |
| S5 | ∞ | 10.00 | | | |

Aspherical Coefficients of Surface S2
$\epsilon = 0.48800$, CRx = 0, CRy = 0, $A_2$ to $A_{16} = 0$
Aspherical Coefficients of Surface S4
$\epsilon = 0.67900$, CRx = 0, CRy = 0, $A_2$ to $A_{16} = 0$

What is claimed is:

1. An illumination optical system comprising:

a light source;

a smoothing device, having an entrance surface through which light from the light source enters the smoothing device and an exit surface through which the light that has entered the smoothing device exits therefrom, for smoothing an intensity distribution of the light on the exit surface; and a relay optical system, including a front lens unit through which the light that has exited from the smoothing device enters the relay optical system, a rear lens unit of which refractive power exhibits asymmetry in one direction and through which the light that has entered the relay optical system exits therefrom, and an aperture stop disposed between the front and rear lens units so as to restrict a diameter of a light flux, for making the light from different parts of the exit surface of the smoothing device converge so as to form an image of the exit surface of the smoothing device.

2. An illumination optical system as claimed in claim 1, wherein the asymmetry of the refractive power of the rear lens unit is defined by a shape of only one of lens surfaces included in the rear lens unit.

3. An illumination optical system as claimed in claim 2, wherein a portion of the surface is discontiguous with an adjoining portion thereof.

4. An illumination optical system as claimed in claim 3, wherein the portion of the surface discontiguous with the adjoining portion thereof is fan-shaped.

5. An illumination optical system as claimed in claim 2, wherein no portion of the surface is discontiguous with an adjoining portion thereof.

6. An image projection apparatus comprising:

an image display device having a reflective surface composed of a large number of mirror elements that are individually directed either in a first or second direction according to an image signal;

an illumination optical system for directing light having a smoothed intensity distribution to an area including the reflective surface of the image display device from a direction inclined relative to the reflective surface in such a way as to smooth the intensity distribution of the light again near the reflective surface; and a projection optical system for projecting light reflected from the mirror elements directed in the first direction, wherein the illumination optical system comprises:

a light source;

a smoothing device, having an entrance surface through which light from the light source enters the smoothing device and an exit surface through which the light that has entered the smoothing device exits therefrom, for smoothing an intensity distribution of the light on the exit surface; and a relay optical system, including a front lens unit through which the light that has exited from the smoothing device enters the relay optical system, a rear lens unit of which refractive power exhibits asymmetry in one direction and through which the light that has entered the relay optical system exits therefrom, and an aperture stop disposed between the front and rear lens units so as to restrict a diameter of a light flux, for making the light from different parts of the exit surface of the smoothing device converge so as to form an image of the exit surface of the smoothing device, the direction in which the refractive power of the rear lens unit exhibits asymmetry coincides with the direction from which the light is directed to the reflective surface, and the refractive power of the rear lens unit is higher in a portion thereof closer to the reflective surface than in a portion thereof farther from the reflective surface.

7. An image projection apparatus as claimed in claim 6, wherein the asymmetry of the refractive power of the rear lens unit is defined by a shape of only one of lens surfaces included in the rear lens unit.

8. An image projection apparatus as claimed in claim 7, wherein a portion of the surface is discontiguous with an adjoining portion thereof.

9. An image projection apparatus as claimed in claim 8, wherein the portion of the surface discontiguous with the adjoining portion thereof is fan-shaped.

10. An image projection apparatus as claimed in claim 7, wherein no portion of the surface is discontiguous with an adjoining portion thereof.

11. An image projection apparatus comprising:

a light source;

a smoothing device, having an entrance surface through which light from the light source enters the smoothing device and an exit surface through which the light that has entered the smoothing device exits therefrom, for smoothing an intensity distribution of the light on the exit surface;

a relay optical system, including a lens element of which refractive power exhibits asymmetry in one direction, for making the light from different parts of the exit surface of the smoothing device converge so as to form an image of the exit surface of the smoothing device;

an image display device having a reflective surface composed of a large number of mirror elements that are individually directed either in a first or second direction according to an image signal; and a projection optical system for projecting light reflected from the mirror elements directed in the first direction.

12. An image projection apparatus as claimed in claim 11, wherein the image display device is arranged in such a way that the reflective surface thereof is inclined relative to an optical axis of the relay optical system.

13. An image projection apparatus as claimed in claim 12, wherein the image display device is arranged in such a way that a center thereof coincides with a position in which light traveling near the optical axis of the relay optical system is imaged.

14. An image projection apparatus as claimed in claim 12 wherein the direction in which the refractive power of the rear lens unit exhibits asymmetry coincides with the direction from which the light is directed to the reflective surface.

15. An image projection apparatus as claimed in claim 14, wherein the refractive power of the rear lens unit is higher in a portion thereof closer to the reflective surface than in a portion thereof farther from the reflective surface.

16. An image projection apparatus as claimed in claim 11, wherein the relay optical system includes a front lens unit through which the light that has exited from the smoothing device enters the relay optical system, a rear lens unit of which refractive power exhibits asymmetry in one direction and through which the light that has entered the relay optical system exits therefrom, and an aperture stop disposed between the front and rear lens units so as to restrict a diameter of a light flux.

* * * * *